(12) United States Patent　　(10) Patent No.:　US 12,597,778 B2
Kang　　(45) Date of Patent:　　Apr. 7, 2026

(54) GRIDFORMING TYPE CURTAILMENT CONTROL SYSTEM AND METHOD

(71) Applicant: KOREA GRID FORMING CO., LTD., Naju-si (KR)

(72) Inventor: Ji Seong Kang, Incheon (KR)

(73) Assignee: KOREA GRID FORMING CO., LTD., Naju-si (KR)

( * ) Notice: Subject to any disclaimer, the term of this patent is extended or adjusted under 35 U.S.C. 154(b) by 390 days.

(21) Appl. No.: 18/485,376

(22) Filed: Oct. 12, 2023

(65) Prior Publication Data

US 2025/0125623 A1　　Apr. 17, 2025

(51) Int. Cl.
　　*H02J 3/38*　　(2006.01)
　　*H02J 3/00*　　(2006.01)
　　*H02J 3/007*　　(2026.01)
　　*H02J 3/32*　　(2006.01)

(52) U.S. Cl.
　　CPC .............. *H02J 3/381* (2013.01); *H02J 3/007* (2020.01); *H02J 3/32* (2013.01); *H02J 2203/10* (2020.01); *H02J 2300/26* (2020.01)

(58) Field of Classification Search
　　CPC .... H02J 3/381; H02J 3/007; H02J 3/32; H02J 2300/26; H02J 2203/10
　　See application file for complete search history.

(56) References Cited

U.S. PATENT DOCUMENTS

| | | | | |
|---|---|---|---|---|
| 2011/0194216 A1* | 8/2011 | Schaub | ................ | H02H 7/1222 |
| | | | | 361/18 |
| 2013/0241297 A1* | 9/2013 | Falk | ...................... | H10F 77/955 |
| | | | | 307/80 |
| 2023/0411965 A1* | 12/2023 | Hart | ......................... | H02J 3/381 |
| 2024/0305101 A1* | 9/2024 | Borregard | ............... | H02J 3/381 |
| 2025/0364812 A1* | 11/2025 | Xue | ......................... | H02J 3/388 |

FOREIGN PATENT DOCUMENTS

| | | |
|---|---|---|
| KR | 10-2013-0104161 A | 9/2013 |
| KR | 10-2014-0130770 A | 11/2014 |
| KR | 10-2014-0143476 A | 12/2014 |
| KR | 10-2017-0020579 A | 2/2017 |
| KR | 10-2019-0101546 A | 9/2019 |
| KR | 10-2019-0143084 A | 12/2019 |
| KR | 10-2022-0101569 A | 7/2022 |

OTHER PUBLICATIONS

Yunyeong Shin et al., "Analysis of Power System Stability Enhancement of Grid Forming for PV plant without LVRT", KIEE Summer Conference Proceedings, Jul. 2023, p. 81-82, KIEE, Korea.

* cited by examiner

*Primary Examiner* — William P Bartlett
(74) *Attorney, Agent, or Firm* — Bridgeway IP Law Group, PLLC; Jihun Kim

(57)　　　ABSTRACT

The present disclosure relates to curtailment control technology for photovoltaic power generation, and more particularly, to a gridforming type curtailment control system and method in link with a photovoltaic inverter. According to the present disclosure, inertia control that cannot be performed in existing photovoltaic inverters may be performed more continuously in link with a gridforming inverter, thereby having an effect of efficiently managing and utilizing existing photovoltaic inverter facilities.

7 Claims, 13 Drawing Sheets

<u>200</u>

210

Gridforming communication unit

220

Gridforming control unit

FIG. 2

GRIDFORMING TYPE CURTAILMENT CONTROL SYSTEM AND METHOD

BACKGROUND OF THE INVENTION

Field of the Invention

The present disclosure relates to curtailment control technology for photovoltaic power generation, and more particularly, to a gridforming type curtailment control system and method in link with a photovoltaic inverter.

Background of the Related Art

In accordance with global carbon reduction policies, an increase in renewable energy generation and a reduction in thermal power plants have been steadily promoted. However, as the number of inverter-based power generation facilities using power electronics to convert renewable energy increases, a weak grid issue is occurring in which an ability of maintaining the voltage and frequency of a power grid is weakened. Furthermore, as renewable energy increases in the power grid, the robustness of the system decreases.

Meanwhile, when receiving a curtailment command, a photovoltaic power plant may respond by storing produced energy in a battery, operating at a lower output, or shutting down the power plant. However, first, the storage method in the battery can only be employed when the battery is installed, and may not be appropriate for existing power plants without batteries to adopt a response method to the curtailment command. Second, the method of operating at a lower output may only be implemented in smart inverters among current source control inverters, but most currently installed photovoltaic inverters do not have a function of operating in this mode. Third, shutting down the power plant is the only realistic option, but since photovoltaic energy cannot be sold while the power plant is shut down, it causes direct economic damage to an owner of the photovoltaic power plant.

In this environment where renewable energy is increasing day by day, existing photovoltaic power plants have been tripped from the power system or have been subject to curtailment measures due to stability issues, making it difficult to respond other than shutting down the power plant.

The background technology of the present disclosure is disclosed in the Korean Patent Registration No. 10-2320750.

SUMMARY OF THE INVENTION

The present disclosure provides a gridforming type curtailment control system and method capable of continuously outputting photovoltaic power generation during a power grid disturbance and providing a limited output during curtailment.

Technical problems to be solved in the present disclosure may not be limited to the above-described problems and other technical problems, which are not mentioned herein, will definitely be understood by those skilled in the art from the following description.

According to an aspect of the present disclosure, a gridforming type curtailment control system is provided.

A gridforming type curtailment control system according to an embodiment of the present disclosure may include a photovoltaic inverter that converts direct current electricity generated by a photovoltaic power plant into alternating current electricity and a gridforming inverter that is linked in parallel with the photovoltaic inverter to perform voltage source control on a power grid.

According to an embodiment of the present disclosure, the system may further include a DC link device connected between the photovoltaic inverter and the gridforming inverter, wherein a switch of the DC link device is open (off) and the photovoltaic inverter and the gridforming inverter are not connected to each other when a DC voltage of the gridforming inverter is higher than that of the photovoltaic inverter, and the switch of the DC link device is conducted (on) and the photovoltaic inverter and the gridforming inverter are connected to each other when the DC voltage of the gridforming inverter is lower than that of the photovoltaic inverter.

According to an embodiment of the present disclosure, the system may further include an energy storage device connected to the gridforming inverter to provide energy.

According to another aspect of the present disclosure, a gridforming type curtailment control method and a computer program recorded on a computer-readable recording medium to execute the same are provided.

A gridforming type curtailment control method according to an embodiment of the present disclosure and a computer program recorded on a computer-readable recording medium to execute the same may include receiving, by a gridforming inverter, a power system trip signal of a photovoltaic inverter or a curtailment command of photovoltaic power generation due to a power grid disturbance, and performing, when receiving the power system trip signal or curtailment command, control corresponding thereto.

According to an embodiment of the present disclosure, the method may include conducting a switch of a DC link device connected between the photovoltaic inverter and the gridforming inverter to connect the photovoltaic inverter and the gridforming inverter when a DC voltage of the gridforming inverter is lower than that of the photovoltaic inverter and controlling, by the gridforming inverter, the output of the photovoltaic power plant at a predetermined DC voltage set point in a DC link with the photovoltaic power plant.

According to an embodiment of the present disclosure, the method may include increasing, when receiving the curtailment command of photovoltaic power generation, an AC output voltage of a power grid to trip the photovoltaic inverter from a power system.

According to the present disclosure, inertia control that cannot be performed in existing photovoltaic inverters may be performed more continuously in link with a gridforming inverter, thereby having an effect of efficiently managing and utilizing existing photovoltaic inverter facilities.

Furthermore, according to the present disclosure, even when an existing photovoltaic inverter is tripped from a power system during a power grid disturbance, photovoltaic power generation energy may be continuously supplied to the power system.

In addition, according to the present disclosure, when a photovoltaic power plant receives a curtailment instruction, power may be provided in a curtailed output mode from a photovoltaic power plant through DC voltage set-point control.

Moreover, according to the present disclosure, when large-scale curtailment may be urgently required due to a lack of system grid stability, an AC output voltage of the gridforming inverter may be increased, thereby performing tripping in the power system of the existing photovoltaic inverter without any other auxiliary devices.

It is to be understood that the effects of the present disclosure are not limited to the foregoing effects, and include all effects that may be deduced from the features described in the detailed description of the invention or the claims.

BRIEF DESCRIPTION OF THE DRAWINGS

FIG. 2 is a block diagram of a gridforming inverter in link with a photovoltaic inverter according to an embodiment of the present disclosure.

DESCRIPTION OF SYMBOLS

Figure 1:
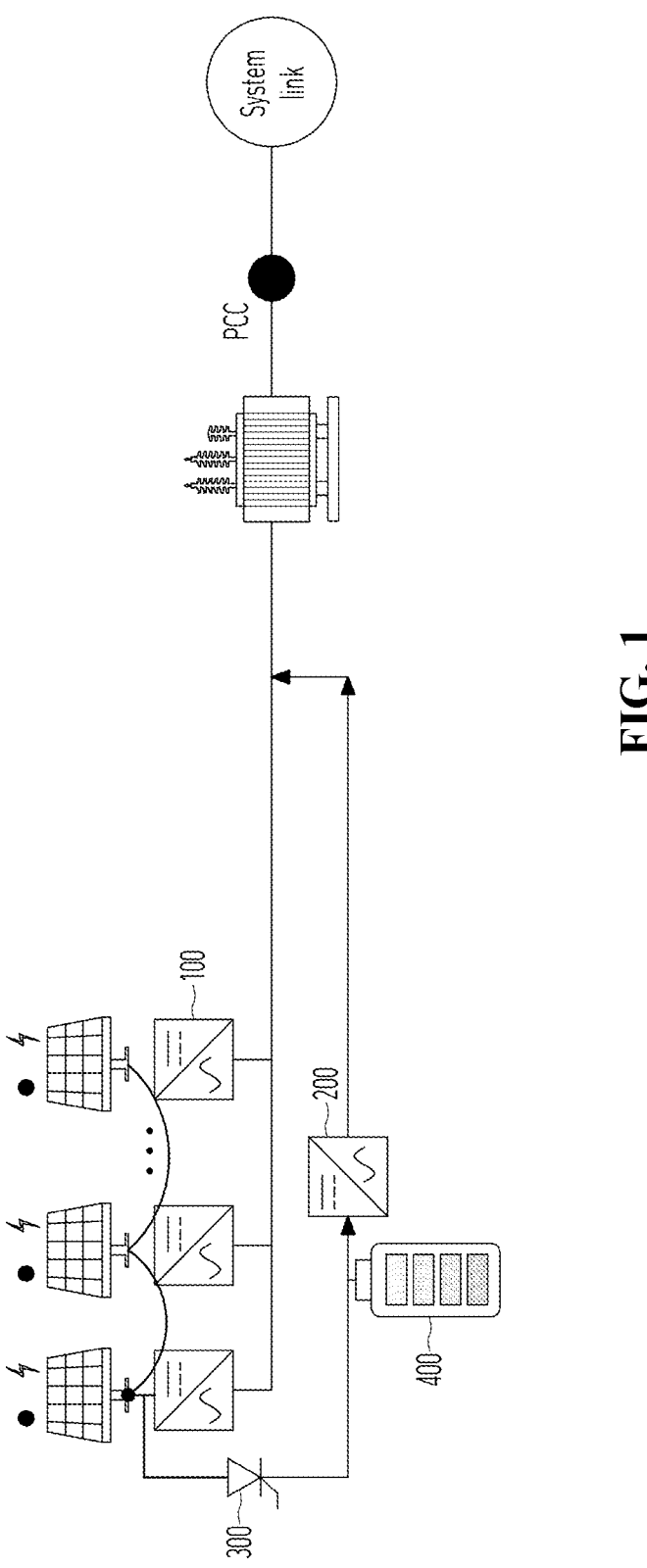
FIG. 1 is a diagram for explaining a gridforming type curtailment control system according to an embodiment of the present disclosure.

100: Photovoltaic inverter
200: Gridforming inverter
210: Gridforming communications unit
220: Gridforming control unit
300: DC link device
400: Energy storage device

DETAILED DESCRIPTION OF THE PREFERRED EMBODIMENT

As various modifications can be made and diverse embodiments are applicable to the present disclosure, specific embodiments will be illustrated with reference to the accompanying drawings and described in detail through the detailed description. However, those specific embodiments should not be construed to limit the present disclosure, and should be construed as being extended to all modifications, equivalents, and substitutes included in the concept and technological scope of the invention. In describing the present disclosure, the detailed description will be omitted when a specific description for publicly known technologies to which the invention pertains is judged to obscure the gist of the present disclosure. A singular expression as used in the specification and the claims is generally to be construed as meaning "one or more" unless indicated otherwise.

Hereinafter, the present disclosure will be described with reference to the accompanying drawings. However, the present disclosure may be implemented in various different forms, and is not limited to the embodiments described herein. In order to clearly describe the present disclosure, parts not related to the description are omitted, and like reference numerals designate like parts throughout the specification.

FIG. 1 is a diagram for explaining a gridforming type curtailment control system according to an embodiment of the present disclosure.

Referring to FIG. 1, the gridforming type curtailment control system includes a photovoltaic inverter 100, a gridforming inverter 200, a DC link device 300, and an energy storage device 400.

The photovoltaic inverter 100 converts direct current electricity generated from a photovoltaic panel into alternating current electricity. The photovoltaic inverter 100 transmits maximum power to a system through a maximum power point tracking (MPPT) algorithm according to the output characteristics of the photovoltaic panel. When the photovoltaic inverter 100 does not control maximum power point tracking, a DC voltage is at a maximum voltage (voltage open circuit (Voc)) point, and only a small amount of current flows when maintaining this point. Therefore, the photovoltaic inverter 100 starts DC voltage control from the maximum voltage point. Since the photovoltaic inverter 100 initially starts at the maximum voltage, it checks an amount of power generation while reducing the DC voltage. If the photovoltaic inverter 100 continues to increase the amount of power generation, then the photovoltaic inverter continues to reduce the DC voltage. The photovoltaic inverter 100 may reduce the DC voltage by increasing a duty ratio of PWM switching. Here, the duty ratio of PWM switching refers to a ratio of switching on and off.

The gridforming inverter 200 is linked in parallel with the photovoltaic inverter 100 to provide stability to a power grid through voltage source control and to avoid an additional curtailment of a photovoltaic power plant. The gridforming inverter 200 may continue the output of photovoltaic power generation through a DC link when the photovoltaic inverter 100 is tripped from a power system due to a power grid disturbance. When the photovoltaic power plant receives a curtailment command from the outside, the gridforming inverter 200 may operate the photovoltaic power plant at a point outside the maximum power point through a DC link, thereby reducing the output of the photovoltaic power plant. When receiving an urgent curtailment command from the outside or determining that curtailment is required for system stabilization, the gridforming inverter 200 may increase an AC output voltage of the gridforming inverter 200 to intentionally trip the photovoltaic inverter 100 from the power system so as to respond to the curtailment. In this case, the gridforming inverter 200 does not have a DC link with the photovoltaic panel. The gridforming inverter 200 may be applied to a new photovoltaic power plant as well as an existing photovoltaic power plant.

Since the gridforming inverter 200 generates a voltage on its own, inertia control may be carried out when the system frequency changes. The photovoltaic inverter 100 has a problem that inertial control cannot be carried out as well as a problem that in case the photovoltaic inverter is tripped from the power system when the system frequency changes, supply-demand imbalance spreads to nearby areas, and problems such as a significant delay in relinking to the system subsequent to tripping, a deterioration in sales profits for power generation companies due to this, and an inability to utilize energy generated from photovoltaic panels. The gridforming inverter 200 may receive energy generated from the photovoltaic power plant when the photovoltaic inverter 100 is tripped from the power system, and maintain inertial control for a long time when the power system frequency changes even though the voltage of the energy storage device 400 drops. Considering that it takes at least several minutes for the photovoltaic inverter 100 to be relinked after tripping from the power system, the gridforming inverter 200 may provide reliability, continuity, and flexibility for the system.

The DC link device 300 connects an output DC circuit of the photovoltaic power plant and an input DC circuit of the gridforming inverter 200 through a switch. The DC link device 300 may reduce an output of the power plant through gridforming control through a DC link (switch-on) subsequent to receiving a curtailment command. The DC link device 300 may be, for example, a diode, thyristor, or the like, and may employ one or more of a direct connection method, a diode connection method, a thyristor connection method, and a DC/DC converter link method, and may be inserted into a positive (+) pole circuit and a negative (−) pole circuit, respectively, as a switch.

When controlling in a steady state in a structure in which the gridforming inverter 200 is connected in parallel with the photovoltaic inverter 100, the DC link device 300 is in an open (switch-off) state while the DC voltage of the gridforming inverter 200 is higher than the DC voltage of the photovoltaic inverter 100. In addition, when the photovoltaic inverter 100 is tripped from a link to the system, the DC link device 300 is switched to a conducting (switch-on) state while the DC voltage of the gridforming inverter 200 is lower than that of the photovoltaic inverter 100.

The energy storage device 400 stores energy, and releases the stored energy through the gridforming inverter 200 when a disturbance occurs in a power grid. The energy storage device 400 may help restore system stability through releasing energy into the system. The energy storage device 400 may use, for example, a super capacitor or battery, but is not limited thereto.

FIG. 2 is a block diagram of a gridforming inverter in link with a photovoltaic inverter according to an embodiment of the present disclosure.

Referring to FIG. 2, the gridforming inverter 200 includes a gridforming communication unit 210 and a gridforming control unit 220.

The gridforming communication unit 210 receives a power system trip signal of the photovoltaic inverter 100 or a curtailment command of photovoltaic power generation due to a power grid disturbance.

The gridforming control unit 220 performs, when receiving a power system trip signal of the photovoltaic inverter 100 or a curtailment command of photovoltaic power generation due to a power grid disturbance, gridforming control corresponding thereto.

More specifically, when receiving a power system trip signal of the photovoltaic inverter 100 due to a power grid disturbance, the gridforming control unit 220 may control the output of the photovoltaic power plant at a predetermined DC voltage set point in a DC link with the photovoltaic power plant so as to operate the photovoltaic power plant at a point outside the maximum power point 320, thereby continuously maintaining the output of the photovoltaic power plant.

Furthermore, when receiving a curtailment command of the photovoltaic power plant from the outside, the gridforming control unit 220 may operate the photovoltaic power plant at a point outside the maximum power point through a DC link with the photovoltaic inverter 100, thereby reducing the output of the photovoltaic power plant.

Furthermore, when receiving an urgent curtailment command from the outside or determining that curtailment is required for system stabilization, the gridforming control unit 220 may increase an AC output voltage of the gridforming inverter 200 above an overvoltage relay cutoff setting value of the photovoltaic inverter to intentionally trip the photovoltaic inverter 100 from the power system so as to respond to the curtailment.

Figure 3:
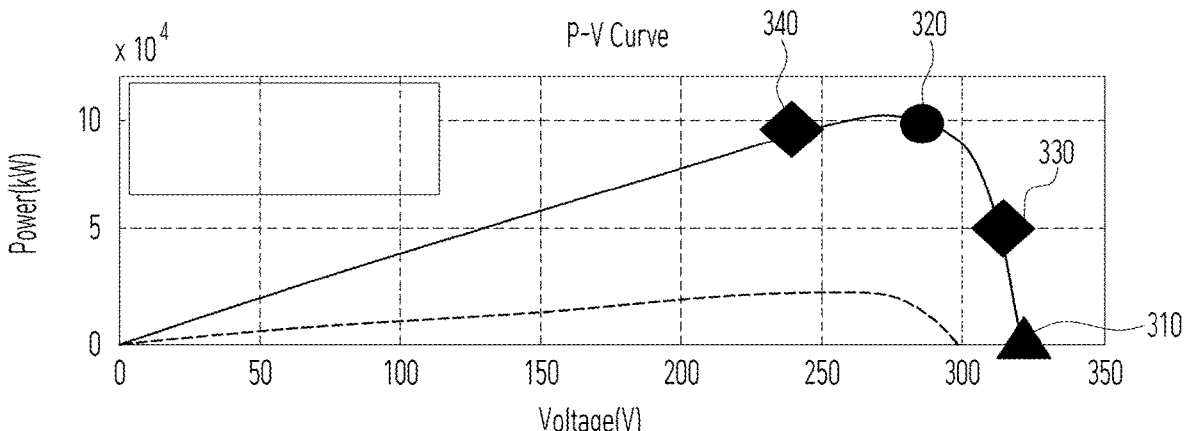
FIG. 3 is a diagram showing a relationship between an output and a voltage of photovoltaic power generation according to an embodiment of the present disclosure.

FIG. 3 is a diagram showing a relationship between an output and a DC voltage of photovoltaic power generation according to an embodiment of the present disclosure.

Referring to FIG. 3, the gridforming type curtailment control system according to the present disclosure transmits maximum generation power to the system through a maximum power point tracking (MPPT) algorithm. The gridforming type curtailment control system according to the present disclosure continues to increase an amount of power generation starting from a voltage open circuit (Voc) point 310, and performs maximum power point tracking control that tracks the maximum power point (MPP) 320.

In the gridforming type curtailment control system according to the present disclosure, when a power grid disturbance occurs such that the photovoltaic inverter 100 is tripped from the power system, the DC link device 300 is changed from an open state to a conducted state to allow the gridforming inverter 200 to be connected to the photovoltaic power plant. Then, the gridforming type curtailment control system may control the output of the photovoltaic power plant at a DC voltage set point 330 or 340 by the gridforming inverter 200, and thus the photovoltaic power plant may be operated at a point outside the maximum power point 320. This may reduce the output of the photovoltaic power plant, but the output of the photovoltaic power plant may be continuously maintained even when the photovoltaic inverter 100 is tripped from the power system.

The DC voltage set point of the gridforming inverter 200 according to the present disclosure may be divided into three types.

1) Normal Voltage Set Point: DC circuits perform a role of maintaining isolation from each other, and retain as much inertial energy as possible according to the formula P=½CV^2

2) Regulated DC Voltage Set Point Adjusted during Tripping of Photovoltaic Inverter 100: Since the maximum power point 320 varies depending on an amount of photovoltaic radiation, conduction is completed by reducing the voltage until the DC link device 300 is conducted, and the voltage is lowered (330 or 340) to a level that does not exceed an open voltage (Voc) 310 of the photovoltaic DC circuit when conduction is established 3) Curtailment DC Voltage Set Point Adjusted to Ensure DC Circuit Conduction for Curtailment Subsequent to Receiving Curtailment Command from Outside: Conduction is completed by reducing the DC voltage until conduction is established, and the voltage is adjusted (330 or 340) within a range that does not exceed an open voltage (Voc) 310 of the photovoltaic DC circuit FIGS. 4 and 5 are diagrams for explaining a gridforming type curtailment control method according to a first embodiment of the present disclosure.

Figure 4:
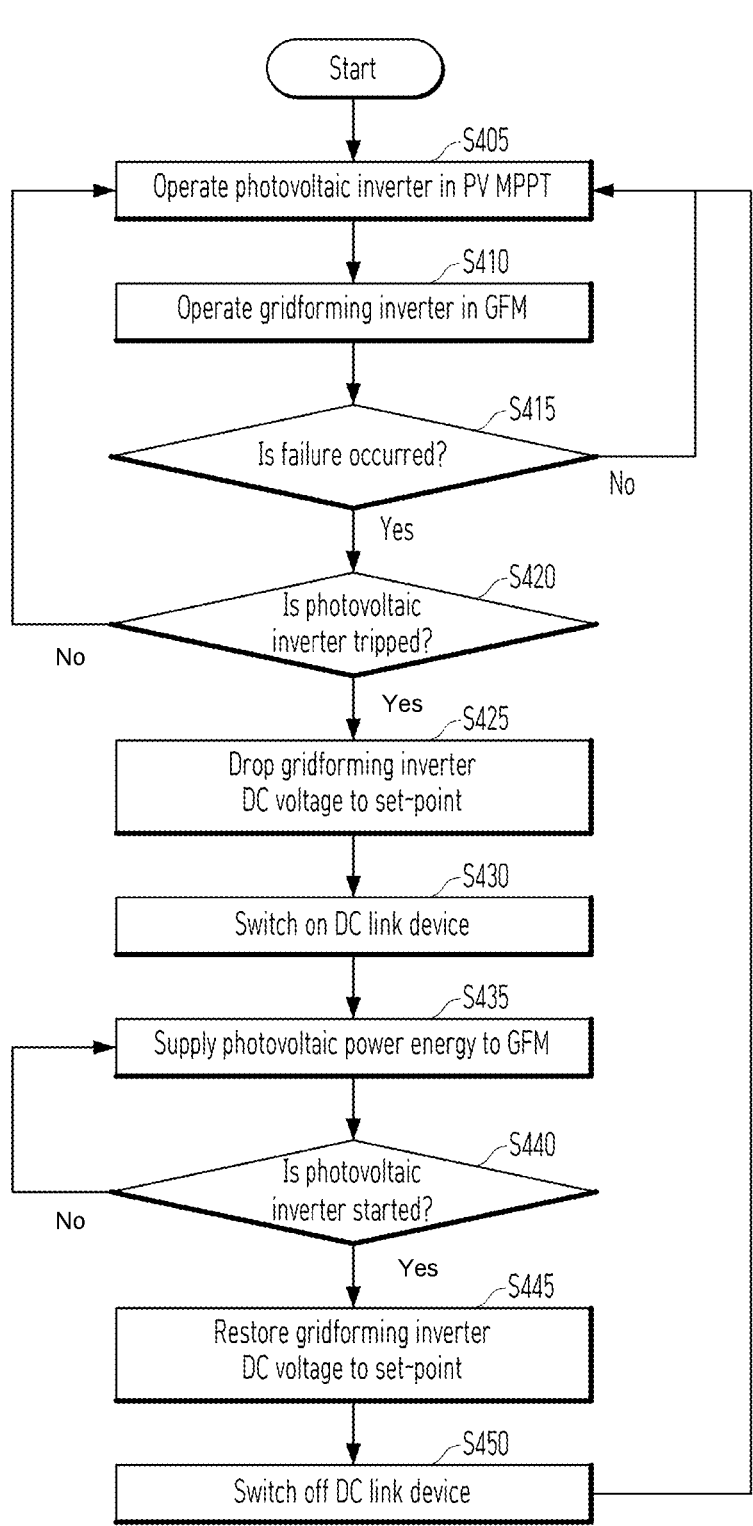
FIGS. 4 and 5 are diagrams for explaining a gridforming type curtailment control method according to a first embodiment of the present disclosure.
Figure 5:
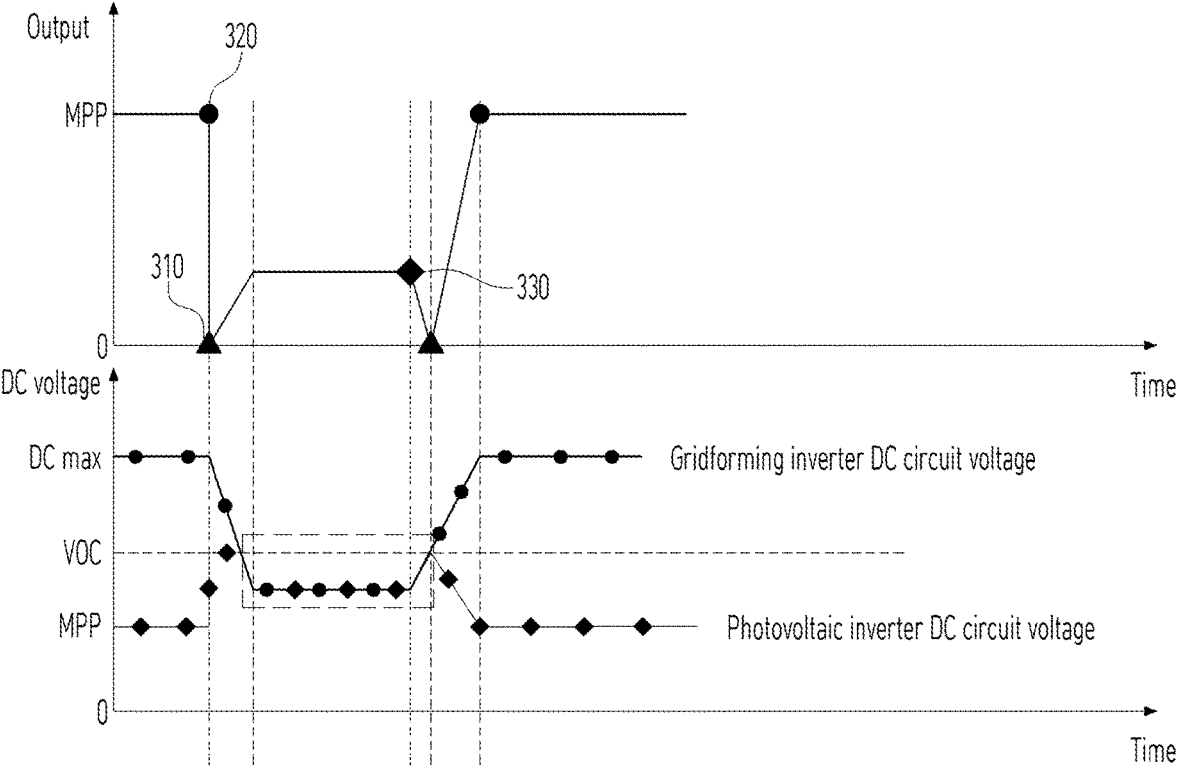

Referring to FIGS. 4 and 5, in step S405, the gridforming type curtailment control system performs an operation through a maximum power point 320 tracking (MPPT) algorithm according to the output characteristics of the photovoltaic (PV) power plant by the photovoltaic inverter 100.

In step S410, in the gridforming type curtailment control system, the gridforming inverter 200 connected in parallel through the photovoltaic inverter 100 and the DC link device 300 performs gridforming converter (GFM) voltage source control at a normal voltage set point.

In step S415, the gridforming type curtailment control system determines whether a failure has occurred due to a power grid disturbance.

In step S420, the gridforming type curtailment control system determines whether the photovoltaic inverter 100 is tripped from the power system when a failure occurs due to a power grid disturbance. Referring to FIG. 5, when the photovoltaic inverter 100 is tripped from the power system, the photovoltaic power plant is switched from a maximum power point (MPP) output 320 to a zero output 310. Additionally, the DC voltage of the photovoltaic inverter increases from a maximum power point (MPP) DC voltage to a voltage state of an open circuit (voltage open circuit (Voc)).

In step S425, when a failure occurs due to a power grid disturbance and the photovoltaic inverter 100 is tripped from the power system, in the gridforming type curtailment control system, the DC voltage of the gridforming inverter 200 drops to a preset regulated voltage set point. In the gridforming type curtailment control system, the DC voltage (normal voltage set point) of the gridforming inverter 200 is maintained at a level (DC max) that is higher than the DC voltage of the photovoltaic inverter 100 in a normal state. The gridforming inverter 200 may adjust the fluctuation of the DC voltage at any time according to voltage source control, that is, gridforming type control, to maintain the DC voltage near the normal voltage set point.

In step S430, in the gridforming type curtailment control system, the DC voltage of the gridforming inverter 200 drops to a preset regulated voltage set point, and thus a switch of the DC link device 300 connected to the output DC circuit of the photovoltaic power plant is turned on (conducted). Referring to FIG. 5, when the switch of the DC link device 300 is turned on (conducted), the output of the photovoltaic power plant increases from the zero output 310 to the output 330 of the gridforming inverter 200.

In step S435, in the gridforming type curtailment control system the gridforming inverter 200 is connected to the photovoltaic power plant to control the output of the photovoltaic power plant at the regulated voltage set point. Referring to FIG. 5, in this case, the gridforming inverter 200 may be connected to the photovoltaic power plant to continuously maintain the output of the gridforming inverter (330 or 340) at a point outside the maximum power point 320 through voltage source control at the regulated voltage set point.

In step S440, the gridforming type curtailment control system determines whether the photovoltaic inverter 100 that has been tripped from the power grid is started.

In step S445, when the photovoltaic inverter 100 that has been tripped from the power grid is started, the gridforming curtailment control system restores the DC voltage of the gridforming inverter 200 is restored to the previous normal voltage set point.

In step S450, the gridforming type curtailment control system turns off (opens) the switch of the DC link device 300 that has been conducted as the DC voltage of the gridforming inverter 200 is restored to the previous normal voltage set point.

When the switch of the DC link device 300 is turned off (open), the gridforming type curtailment control system returns to step S405 and the photovoltaic inverter 100 is operated at the maximum power point 320 according to the output characteristics of the photovoltaic power plant.

Figure 6:
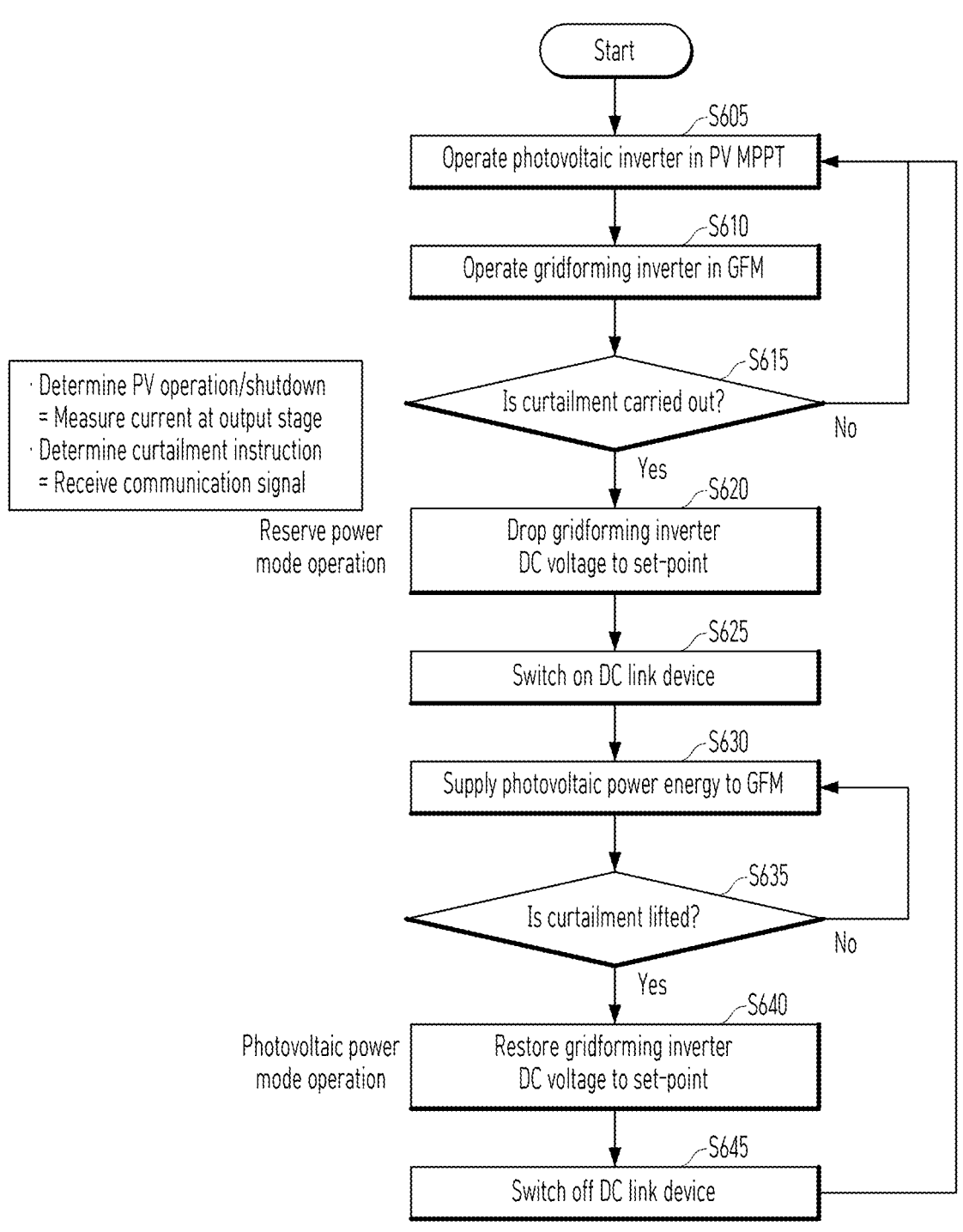
FIGS. 6 and 7 are diagrams for explaining a gridforming type curtailment control method according to a second embodiment of the present disclosure.
Figure 7:
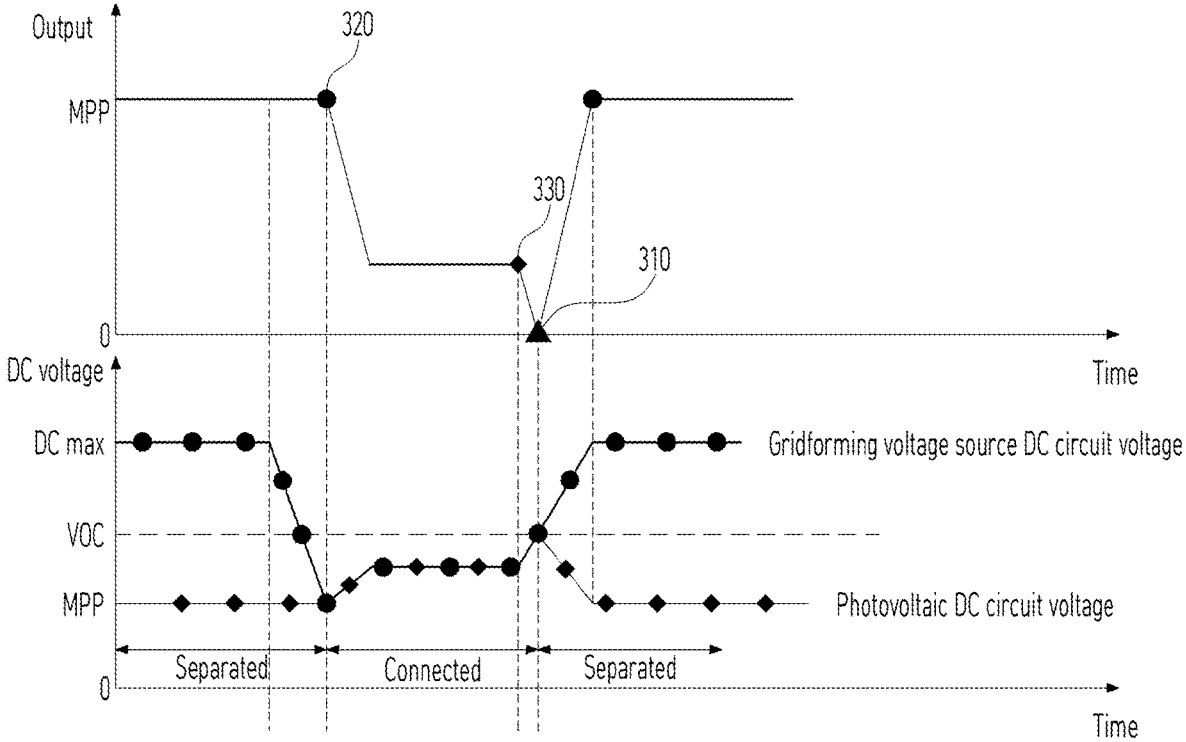

FIGS. 6 and 7 are diagrams for explaining a gridforming type curtailment control method according to a second embodiment of the present disclosure.

Referring to FIGS. 6 and 7, in step S605, the gridforming type curtailment control system performs operation through a maximum power point 320 tracking (MPPT) algorithm according the output characteristics of the photovoltaic (PV) power plant.

In step S610, in the gridforming type curtailment control system, the gridforming inverter 200 connected in parallel through the photovoltaic inverter 100 and the DC link device 300 performs gridforming converter (GFM) voltage source control at a normal voltage set point 420.

In step S615, the gridforming type curtailment control system determines whether curtailment is carried out. Here, in the gridforming type curtailment control system determines whether to operate or shut down photovoltaic power through measuring a current at an output stage of photovoltaic power generation, and determines whether to receive a curtailment instruction through the receipt of a communication signal.

In step S620, in the gridforming type curtailment control system, when curtailment is carried out as a result of determination, the DC voltage of the gridforming inverter 200 drops to a predetermined set point. In the gridforming type curtailment control system, the DC voltage (normal voltage set point) of the gridforming inverter 200 is maintained at a level (DC max) that is higher than the DC voltage of the photovoltaic inverter 100 in a normal state, and drops to the maximum power point DC voltage.

In step S625, in the gridforming type curtailment control system, the DC voltage of the gridforming inverter 200 drops to the maximum power point DC voltage, and thus a switch of the DC link device 300 connected to the output DC circuit of the photovoltaic power plant is turned on (conducted).

In step S630, in the gridforming type curtailment control system the gridforming inverter 200 is in link with the photovoltaic inverter 100 to control the output of the photovoltaic power plant at the regulated voltage set point. Referring to FIG. 7, in this case, the gridforming inverter 200 may be in link with the photovoltaic inverter 100 to continuously maintain the output of the photovoltaic power plant (330 or 340) at a point outside the maximum power point 320 through voltage source control at the regulated voltage set point.

In step S635, the gridforming type curtailment control system determines whether curtailment is lifted.

In step S640, in the gridforming type curtailment control system, when curtailment is lifted, the DC voltage of the gridforming inverter 200 is restored to the previous normal voltage set point.

In step S645, as the DC voltage of the gridforming inverter 200 is restored to the previous normal voltage set point, the switch of the DC link device 300 that has been conducted is turned off (open). When the switch of the DC link device 300 is turned off (open), in the gridforming type curtailment control system, the output of the photovoltaic power plant drops to a zero state 310, and then immediately the photovoltaic inverter 100 is operated at the maximum power point 320 according to the output characteristics of the photovoltaic power plant.

Figure 8:
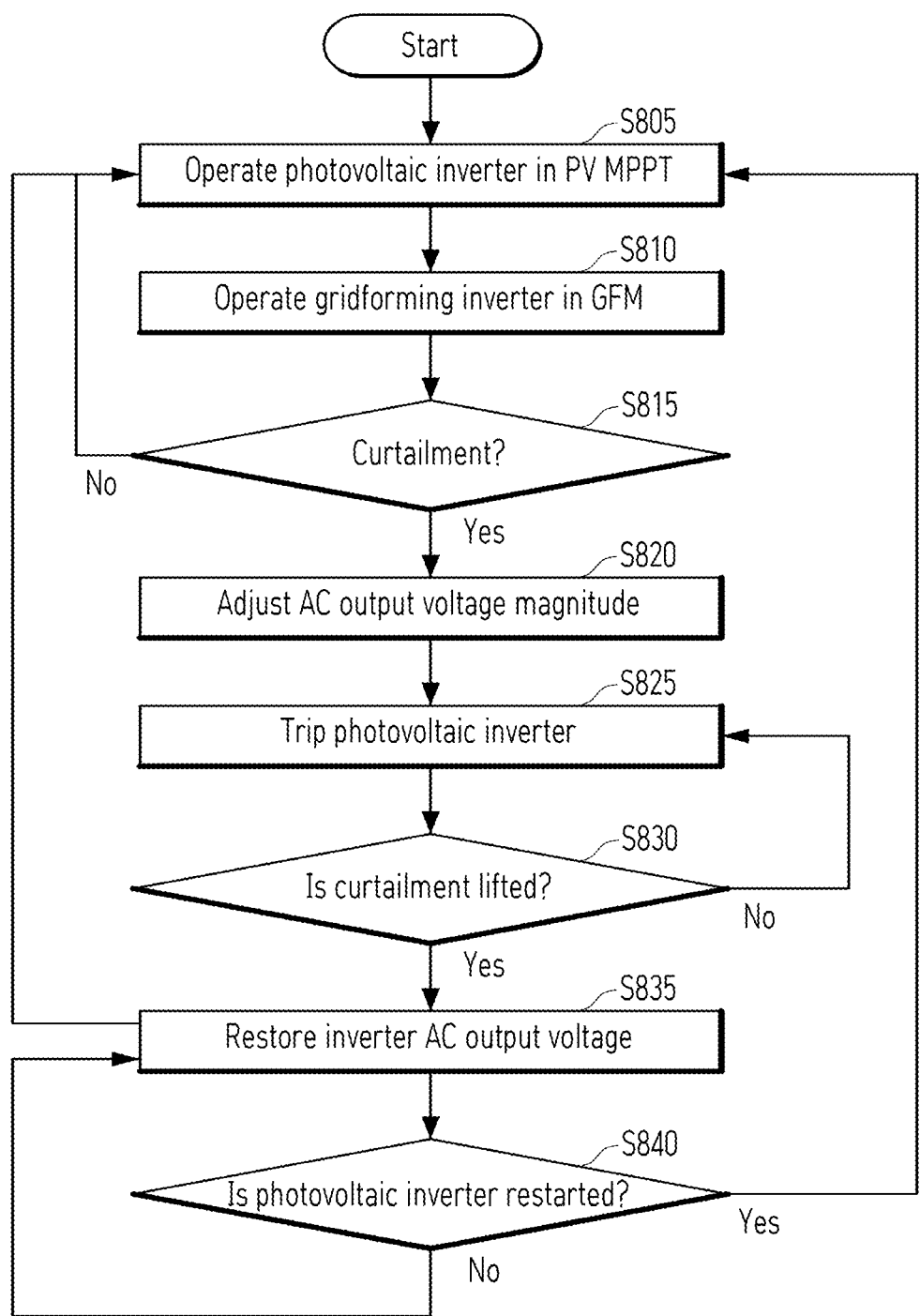
FIGS. 8 and 9 are diagrams for explaining a gridforming type curtailment control method according to a third embodiment of the present disclosure.
Figure 9:
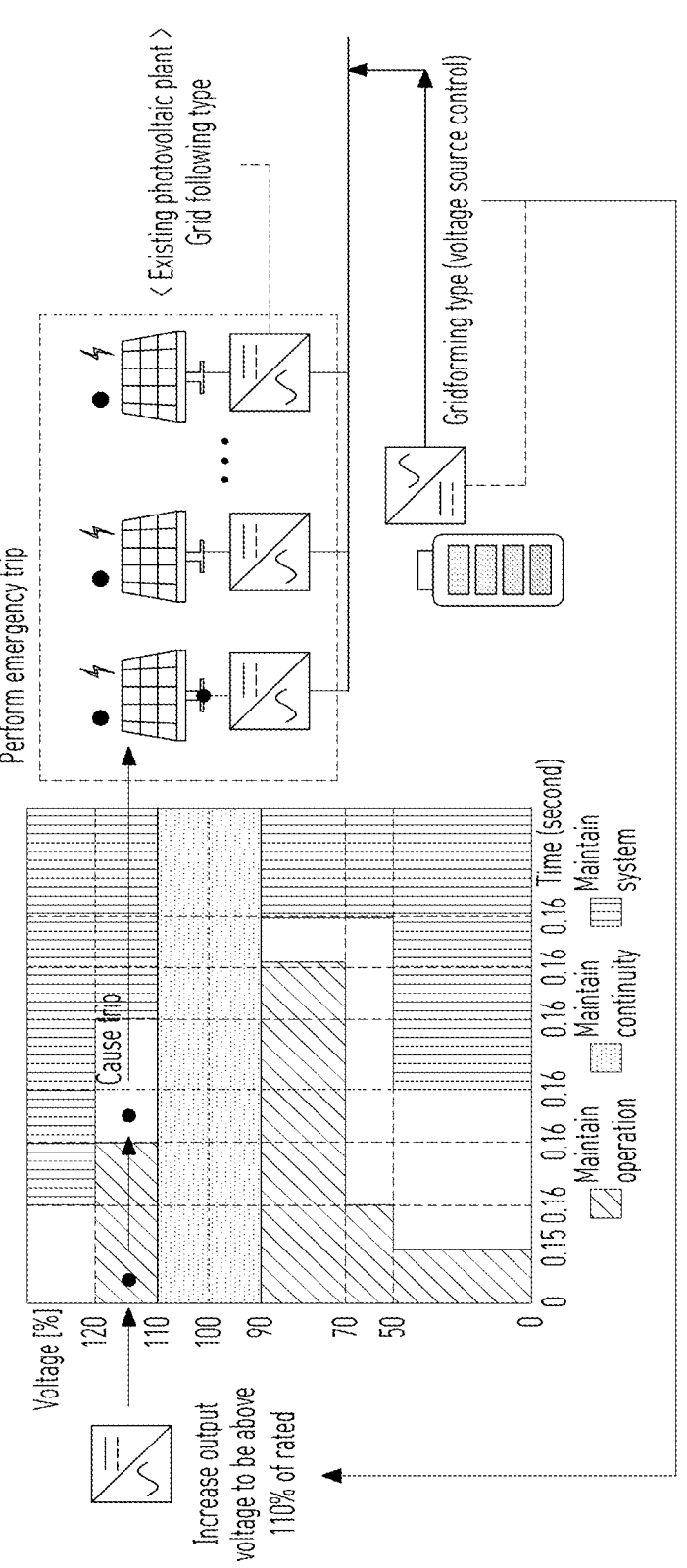

FIGS. 8 and 9 are diagrams for explaining a gridforming type curtailment control method according to a third embodiment of the present disclosure.

Referring to FIGS. 8 and 9, in step S805, the gridforming type curtailment control system performs operation through a maximum power point 320 tracking (MPPT) algorithm according the output characteristics of the photovoltaic (PV) power plant by the photovoltaic inverter 100.

In step S810, in the gridforming type curtailment control system, the gridforming inverter 200 performs gridforming GFM (gridforming converter) voltage source control. Here, the gridforming inverter 200 is connected to the power grid but is not connected through the photovoltaic inverter 100 and the DC link device 300.

In step S815, the gridforming type curtailment control system determines whether curtailment is carried out. The gridforming type curtailment control system according to the present disclosure may urgently require large-scale curtailment when system grid stability becomes insufficient. In this case, the gridforming type curtailment control system may determine whether to perform curtailment through receipt of a communication signal.

In step S820, when curtailment is carried out as a result of determination by the gridforming type curtailment control system, the gridforming inverter 200 adjusts an AC output voltage of the power grid to be above an overvoltage relay cutoff setting value of the photovoltaic inverter 100. Here, the overvoltage relay cutoff setting value of the photovoltaic inverter 100 may be 110% of the rated AC output voltage.

Referring to FIG. 9, the gridforming type curtailment control system may perform tripping on the photovoltaic inverter through increasing the AC output voltage in the event of an emergency curtailment so as to achieve stabilization. Here, a time period to increase the AC output voltage may be within 0.5 seconds to 1 second depending on a ride-through graph.

In step S825, in the gridforming type curtailment system, when the gridforming inverter 200 performs voltage source control to adjust a normal output voltage of the power grid to be above the overvoltage relay cutoff setting value of the photovoltaic inverter 100, the photovoltaic inverter 100 is tripped from the power grid due to a power grid disturbance.

In step S830, the gridforming type curtailment control system determines whether curtailment is lifted.

In step S835, in the gridforming type curtailment control system, when curtailment is lifted, the gridforming inverter 200 is readjusted to a normal output voltage of the power grid.

In step S840, the gridforming type curtailment control system determines whether the photovoltaic inverter 100 that has been tripped from the power grid is restarted.

Then, when the photovoltaic inverter 100 is restarted, the gridforming type curtailment control system returns to step S805 to operate at the maximum power point 320 according to the output characteristics of the photovoltaic power plant.

Figure 10:
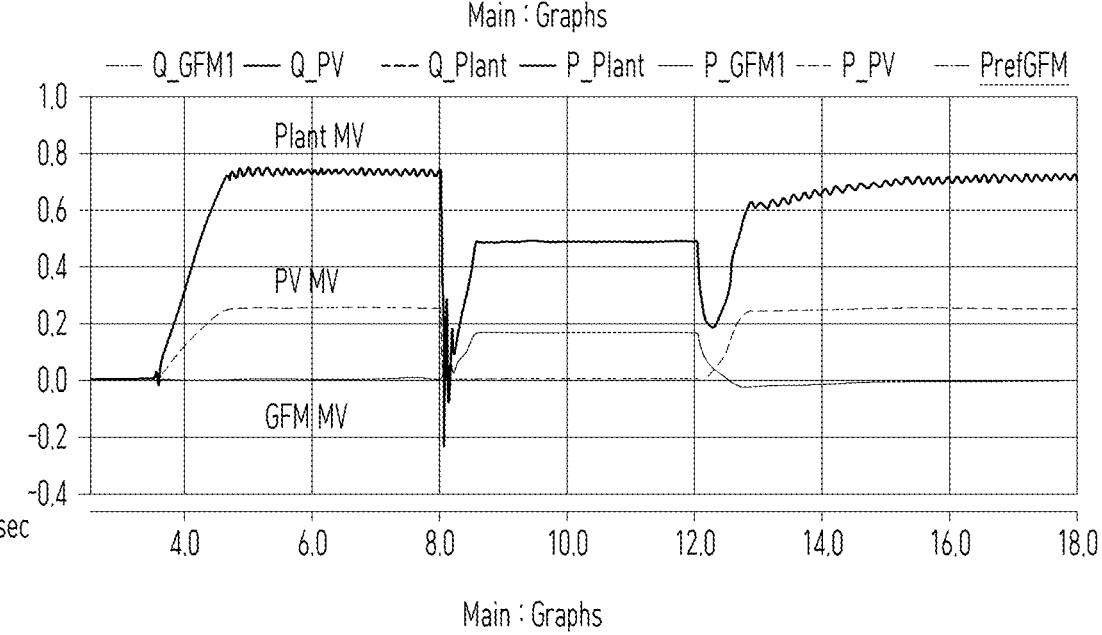
FIG. 10 is a diagram for explaining a gridforming type curtailment control simulation result according to the first embodiment of the present disclosure.
Figure 10:
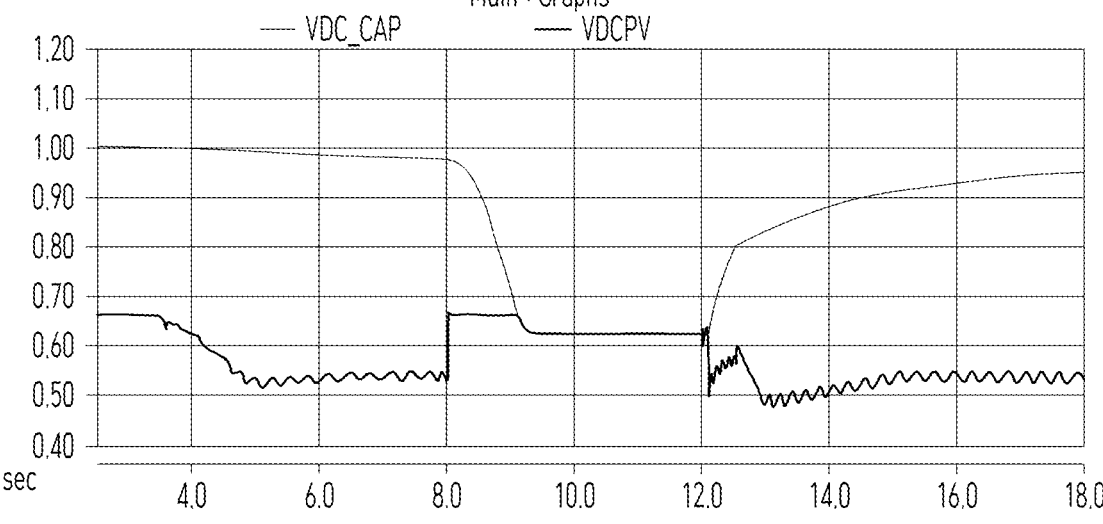

FIG. 10 is a diagram for explaining a gridforming type curtailment control simulation result according to the first embodiment of the present disclosure.

An upper graph of FIG. 10 is a diagram simulating an output (Plant MW) of the photovoltaic power plant, an output (PV MW) of the photovoltaic panel, and an output (GFM MW) of the gridforming inverter 200 in the gridforming type curtailment control system. The photovoltaic power plant consists of multiple photovoltaic panels, and is equal to the sum of the outputs (PV MW) of multiple photovoltaic panels. The photovoltaic power plant outputs 0.75 MW through maximum power point tracking control in a simulation result. Then, when the photovoltaic inverter 100 is tripped from the gridforming type curtailment control system at 8.0 seconds, the photovoltaic power plant has an output of 0 MW, but the photovoltaic panels may be in link with the gridforming inverter 200 through the DC link device 300, and the photovoltaic power plant may output the power of 0.47 MW. In this case, the output (Plant MW) of the photovoltaic power plant is equal to the sum of the outputs (GFM MW) of multiple gridforming inverters when the photovoltaic inverters 100 are tripped and connected to the gridforming inverters 200. When the photovoltaic inverter 100 is tripped from the gridforming type curtailment control system, photovoltaic power generation may be output through the gridforming inverter 200 to prevent the previous output of 0.75 MW from becoming 0 MW and to output 0.47 MW, which is a level of 63% of the previous output, thereby continuously supplying energy from the photovoltaic power plant to the power system even when the existing photovoltaic inverter is tripped from the power system during a power grid disturbance. Then, when the photovoltaic inverter is restarted at 12.0 seconds, the photovoltaic power plant outputs 0.75 MW through maximum power point tracking control through the photovoltaic inverter again.

A lower graph of FIG. 10 is a diagram simulating a DC voltage (PV DCV) of the photovoltaic panel and a DC voltage (GFM DCV) of the gridforming inverter in the gridforming type curtailment control system. The DC voltage (PV DCV) of the photovoltaic panel is maintained around 0.53 kV through maximum power point tracking control in a simulation result. The DC voltage (GFM DCV) of the gridforming inverter is maintained around 1.00 kV, which is a preset normal voltage set point. Then, when the photovoltaic inverter is tripped from the gridforming type curtailment control system at 8.0 seconds, the DC voltage (GFM DCV) of the gridforming inverter drops to a regulated DC voltage set point until the DC link device 300 is conducted. Then, when the photovoltaic inverter is restarted at 12.0 seconds, the DC voltage (GFM DCV) of the gridforming inverter is restored to around 1.00 kV, which is a normal voltage set point.

Figure 11:
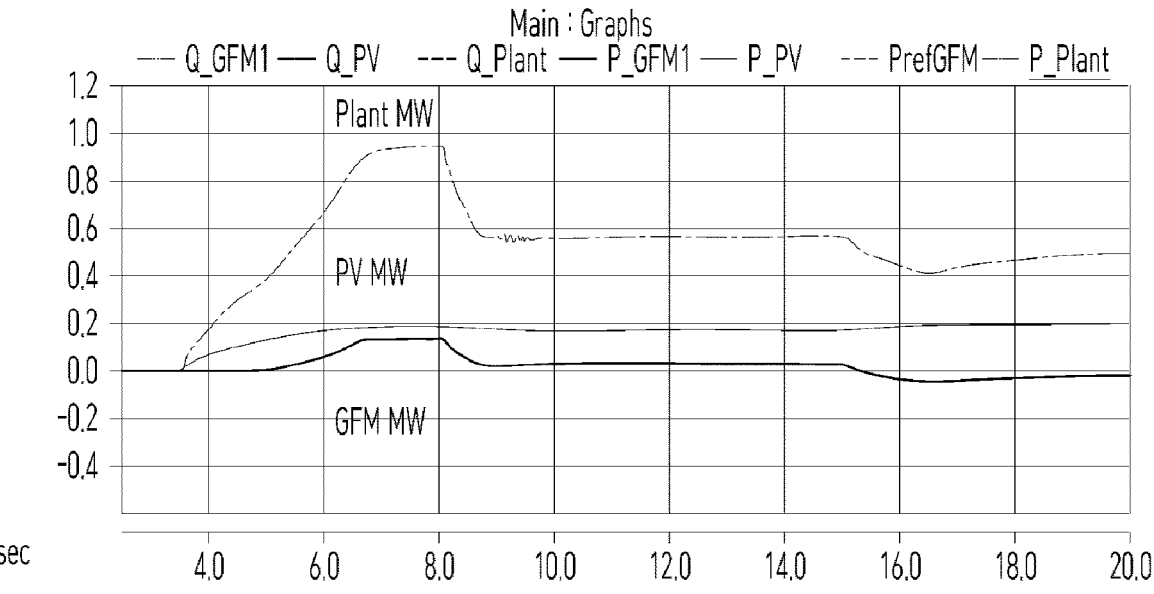
FIGS. 11 and 12 are diagrams for explaining a gridforming type curtailment control simulation result according to the second embodiment of the present disclosure.
Figure 11:
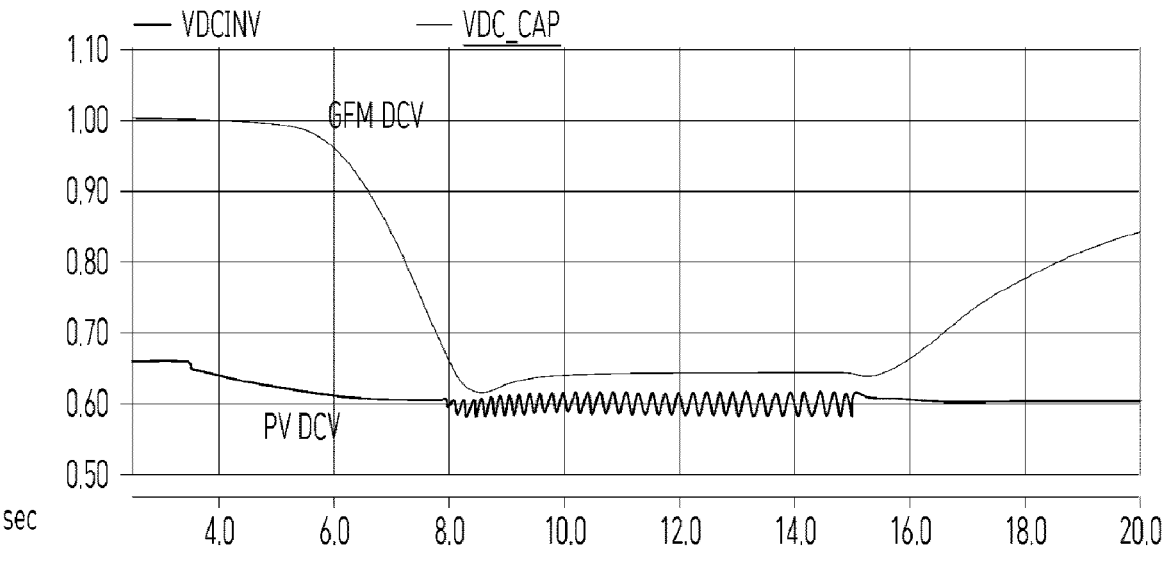
Figure 12:
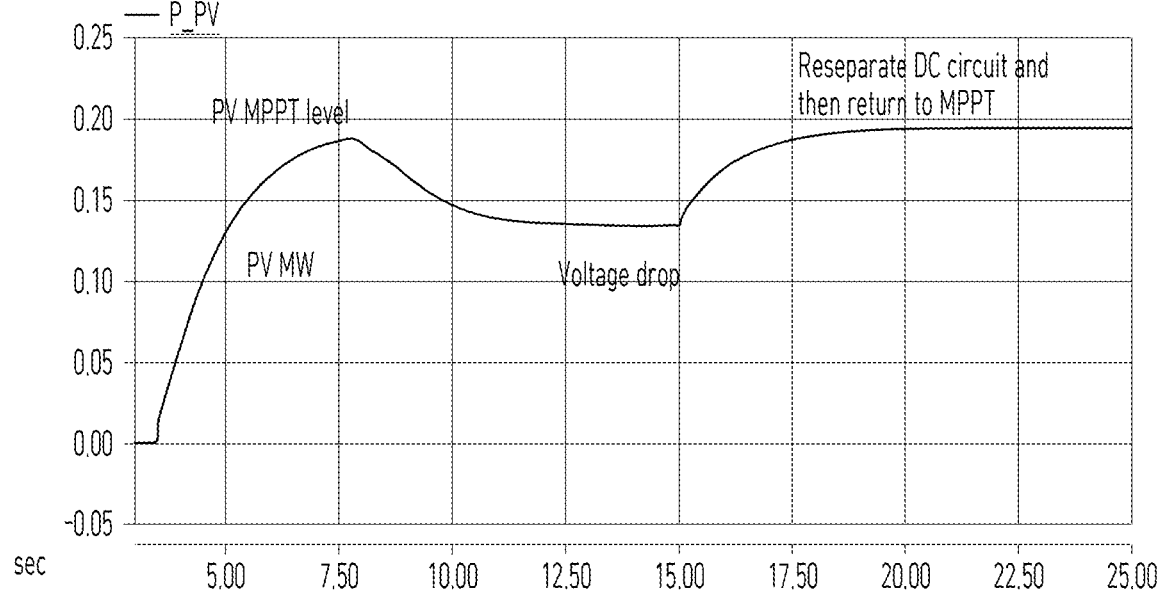

FIGS. 11 and 12 are diagrams for explaining a gridforming type curtailment control simulation result according to the second embodiment of the present disclosure.

An upper graph of FIG. 11 is a diagram simulating an output (Plant MW) of the photovoltaic power plant, an output (PV MW) of the photovoltaic panel, and an output (GFM MW) of the gridforming inverter in the gridforming type curtailment control system. The photovoltaic power plant consists of multiple photovoltaic panels, and is equal to the sum of the outputs (PV MW) of multiple photovoltaic panels. The photovoltaic power plant outputs around 0.95 MW through maximum power point tracking control in a simulation result. Then, when the gridforming type curtailment control system receives a curtailment command from the outside at 8.0 seconds, the photovoltaic inverter 100 and the gridforming inverter 200 may be operated at a point outside the maximum power point through a DC link, thereby reducing the output of the photovoltaic power plant to around 0.6 MW. In this case, in the gridforming type curtailment control system, the photovoltaic panel is connected to both the photovoltaic inverter 100 and the gridforming inverter 200, and thus the output (Plant MW) of the photovoltaic plant is equal to the sum of the outputs (PV MW) of the corresponding multiple photovoltaic panels and the outputs (GFM MW) of the corresponding multiple gridforming inverters.

FIG. 12 is an enlarged diagram of only an output portion of the photovoltaic panel in an upper graph of FIG. 11. Referring to FIG. 12, an output (PV MW) of the photovoltaic panel outputs 0.18 MW through the photovoltaic inverter 100 through maximum power point tracking control. Then, when the gridforming inverter 200 is linked by an external curtailment command at 7.5 seconds, the photovoltaic panel outputs 0.13 MW through the photovoltaic inverter 100 to cause the output power to drop by about 28%, and then is restored to its original state when the curtailment command is lifted at 15 seconds Referring again to FIG. 11, a lower graph of FIG. 11 is a diagram simulating a DC voltage (PV DCV) of the photovoltaic panel and a DC voltage (GFM DCV) of the gridforming inverter in the gridforming type curtailment control system. The DC voltage (GFM DCV) of the gridforming inverter is maintained around 1.00 kV, which is a preset normal voltage set point. Then, when the gridforming type curtailment control system receives a curtailment command from the outside at 8.0 seconds, the DC voltage (GFM DCV) of the gridforming inverter drops to the curtailment DC voltage set point until the DC link device 300 is conducted.

Figure 13:
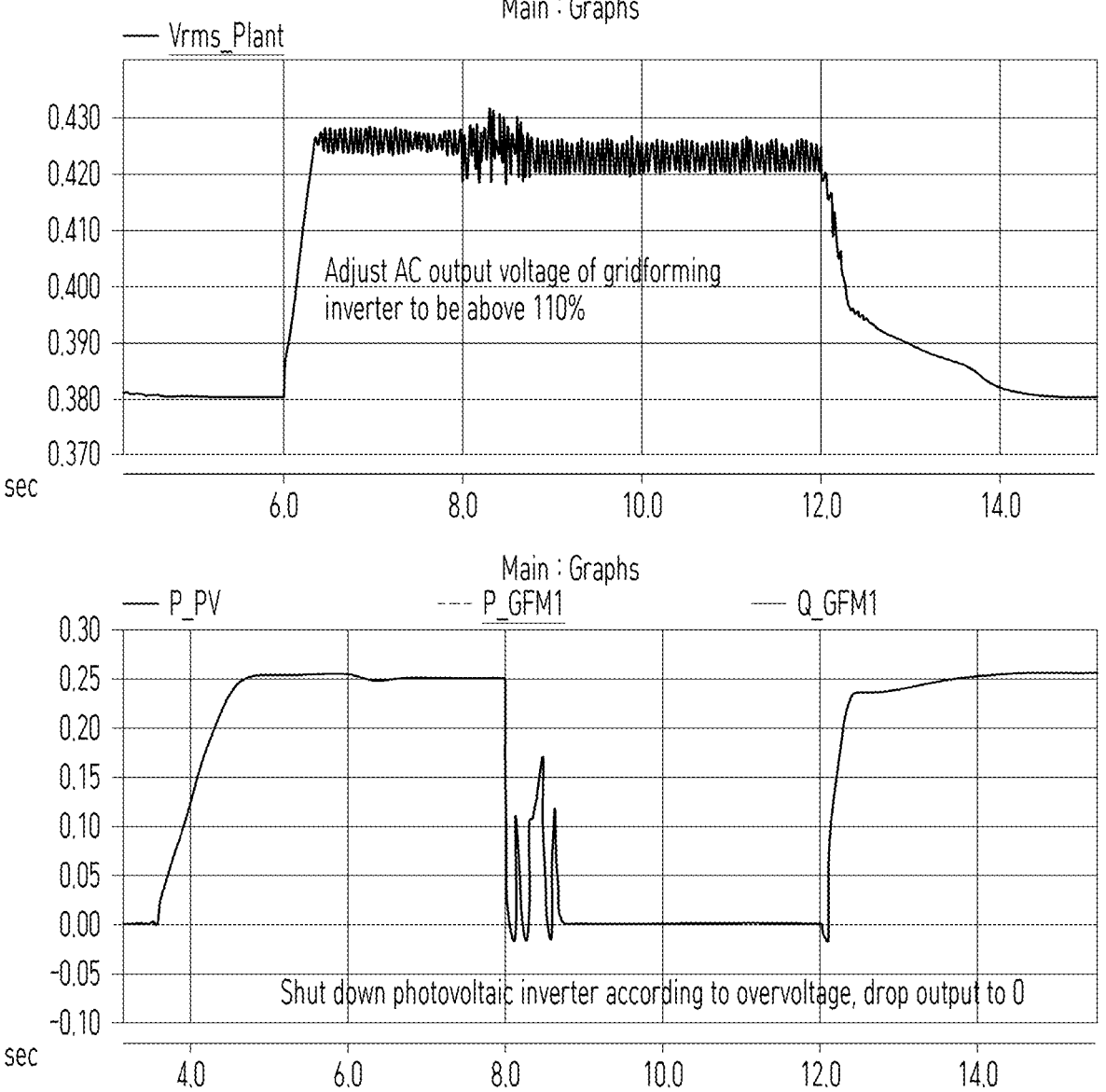
FIG. 13 is a diagram for explaining a gridforming type curtailment control simulation result according to the third embodiment of the present disclosure.

FIG. 13 is a diagram for explaining a simulation result in a gridforming type curtailment control method according to the third embodiment of the present disclosure.

An upper graph of FIG. 13 is a diagram simulating an AC output of the gridforming inverter 200 in the gridforming type curtailment control system. In the gridforming type curtailment control system according to the third embodiment of the present disclosure, when an emergency curtailment command is received from the outside at 6.0 seconds, the gridforming inverter 200 adjusts an AC output to be above an overvoltage relay cutoff setting value of the photovoltaic inverter connected to the photovoltaic panel. Here, the overvoltage relay cutoff setting value may be, for example, 110% of the rated AC output of the photovoltaic inverter. In the gridforming type curtailment control system according to the third embodiment of the present disclosure, the gridforming inverter 200 is not connected to but separated from the photovoltaic panel through the DC link device 300.

A lower graph of FIG. 13 is a diagram simulating an output (P_PV) of the photovoltaic inverter 100 in the gridforming type curtailment control system The output of the photovoltaic inverter 100 is cut off (tripped) from the power system due to an overvoltage, and the output (P_PV) of the photovoltaic inverter 100 drops to 0.

The description of the presented embodiments is provided to allow those skilled in the art to use or implement the present disclosure. Various modifications to these embodiments will be apparent to those skilled in the art, and the general principles defined herein may be applied to other embodiments without departing from the scope of the invention. Thus, the present disclosure is not limited to the embodiments presented herein, but is to be construed in the broadest scope consistent with the principles and novel features presented herein.

What is claimed is:

1. A gridforming type curtailment control system, the system comprising:
   a photovoltaic inverter configured to convert direct current electricity generated by a photovoltaic panel into alternating current electricity; and
   a gridforming inverter linked in parallel with the photovoltaic inverter to perform voltage source control on a power grid,
   wherein the gridforming inverter comprises:
   a gridforming communication unit configured to receive at least one of (i) a power system trip signal of the photovoltaic inverter or (ii) a curtailment command for photovoltaic power generation due to a power grid disturbance; and

a gridforming control unit configured to perform, in response to receiving the power system trip signal or curtailment command, a corresponding control operation,
   wherein when receiving a curtailment command for a photovoltaic power plant from an external source, the gridforming control unit controls an output of the photovoltaic panel at a point outside a maximum power point of the photovoltaic panel via a DC link connected to the photovoltaic inverter.

2. The system of claim 1, further comprising:
   a DC link device connected between the photovoltaic inverter and the gridforming inverter,
   wherein a switch of the DC link device is open (off) and the photovoltaic inverter and the gridforming inverter are disconnected when a DC voltage of the gridforming inverter is higher than that of the photovoltaic inverter, and the switch of the DC link device is conducted (on) and the photovoltaic inverter and the gridforming inverter are connected to each other when the DC voltage of the gridforming inverter is lower than that of the photovoltaic inverter.

3. The system of claim 1, further comprising:
   an energy storage device connected to the gridforming inverter to release stored energy through the gridforming inverter when a disturbance occurs in the power grid.

4. The system of claim 1, wherein when receiving a power system trip signal of the photovoltaic inverter due to a power grid disturbance, the gridforming control unit controls an output of the photovoltaic panel at a predetermined DC voltage set point in a DC link connected to the photovoltaic panel.

5. A gridforming type curtailment control system, the system comprising:
   a photovoltaic inverter configured to convert direct current electricity generated by a photovoltaic panel into alternating current electricity; and
   a gridforming inverter linked in parallel with the photovoltaic inverter to perform voltage source control on a power grid,
   wherein the gridforming inverter comprises:
   a gridforming communication unit configured to receive at least one of (i) a power system trip signal of the photovoltaic inverter or (ii) a curtailment command for photovoltaic power generation due to a power grid disturbance; and
   a gridforming control unit configured to perform, in response to receiving the power system trip signal or curtailment command, a corresponding control operation,
   wherein when receiving an urgent curtailment command from an external source or determining that curtailment is required for system stabilization, the gridforming control unit increases an AC output voltage of the power grid to trip the photovoltaic inverter from a power system.

6. A gridforming type curtailment control method performed in a gridforming type curtailment control system comprising a photovoltaic inverter that is configured to convert direct current electricity generated by a photovoltaic panel into alternating current electricity, and a gridforming inverter that is linked in parallel with the photovoltaic inverter to perform voltage source control on a power grid, the method comprising:

receiving, by the gridforming inverter, a power system trip signal of the photovoltaic inverter or a curtailment command for photovoltaic power generation due to a power grid disturbance;

performing, in response to receiving the power system trip signal or curtailment command, a corresponding control operation;

conducting a switch of a DC link device connected between the photovoltaic inverter and the gridforming inverter to connect the photovoltaic inverter and the gridforming inverter when a DC voltage of the gridforming inverter is lower than that of the photovoltaic inverter; and controlling, by the gridforming inverter, an output of a photovoltaic power plant at a predetermined DC voltage set point in a DC link connected to the photovoltaic power plant.

7. A gridforming type curtailment control method performed in a gridforming type curtailment control system comprising a photovoltaic inverter that is configured to convert direct current electricity generated by a photovoltaic panel into alternating current electricity, and a gridforming inverter that is linked in parallel with the photovoltaic inverter to perform voltage source control on a power grid, the method comprising:

receiving, by the gridforming inverter, a power system trip signal of the photovoltaic inverter or a curtailment command for photovoltaic power generation due to a power grid disturbance;

performing, in response to receiving the power system trip signal or curtailment command, a corresponding control operation; and receiving, by the gridforming inverter, the curtailment command for photovoltaic power generation through increasing, when receiving the curtailment command for photovoltaic power generation, an AC output voltage of the power grid to trip the photovoltaic inverter from a power system.

* * * * *